(12) United States Patent
Morrow et al.

(10) Patent No.: US 10,519,362 B2
(45) Date of Patent: *Dec. 31, 2019

(54) SINGLE-WELL DIAGNOSTICS AND INCREASED OIL RECOVERY BY OIL INJECTION AND SEQUENTIAL WATERFLOODING

(75) Inventors: Norman R. Morrow, Laramie, WY (US); Sheena Xina Xie, Laramie, WY (US); Nina Loahardjo, Laramie, WY (US)

(73) Assignee: University of Wyoming, Laramie, WY (US)

( * ) Notice: Subject to any disclaimer, the term of this patent is extended or adjusted under 35 U.S.C. 154(b) by 376 days.

This patent is subject to a terminal disclaimer.

(21) Appl. No.: 13/384,691

(22) PCT Filed: Jul. 16, 2010

(86) PCT No.: PCT/US2010/042299
§ 371 (c)(1),
(2), (4) Date: May 3, 2012

(87) PCT Pub. No.: WO2011/011284
PCT Pub. Date: Jan. 27, 2011

(65) Prior Publication Data
US 2013/0025853 A1    Jan. 31, 2013

Related U.S. Application Data

(60) Provisional application No. 61/226,709, filed on Jul. 18, 2009.

(51) Int. Cl.
*E21B 43/16*    (2006.01)
*C09K 8/58*    (2006.01)

(52) U.S. Cl.
CPC ..................................... *C09K 8/58* (2013.01)

(58) Field of Classification Search
CPC .......... E21B 43/16; E21B 43/26; E21B 43/256
See application file for complete search history.

(56) References Cited

U.S. PATENT DOCUMENTS 2,885,002 A * 5/1959 Jenks ............................ 166/245
3,497,007 A * 2/1970 Ayers, Jr. et al. ......... 166/270.1
(Continued)

OTHER PUBLICATIONS

International Search Report, International Searching Authority, dated Sep. 14, 2010, pp. 1-11.

*Primary Examiner* — Silvana C Runyan
(74) *Attorney, Agent, or Firm* — Samuel M. Freund; Cochran Freund & Young LLC

(57) ABSTRACT

A method for residual oil recovery from oil reservoirs, and diagnostic tests for determining its efficiency using a single well are described. The method includes injecting oil into a well in a reservoir that has been previously waterflooded or an oil reservoir or zone of an oil reservoir which contains immobile oil at the time of discovery, and extracting the oil by waterflooding the charged zones by placing the injection well in production. The target zone from which oil is recovered may be increased by following injection of oil with injection of water to push an oil bank which grows in volume as a function of distance of propagation, because of the effect of waterflooding on residual oil. The well may then be placed in production and the oil bank volume will continue to increase in volume as it returns to the well, again because of the waterflooding effect. The oil bank is then produced at the surface. The double-sweep waterflooding process using a single well can be repeated by again charging with oil followed by waterflooding. Sequential injection of oil and water to generate more than one oil bank may also be used to increase oil recovery by multiple sequential waterfloods. Combinations of oil injection and sequential waterflooding also have application to reservoir diagnostics.

14 Claims, 14 Drawing Sheets

(56) References Cited

U.S. PATENT DOCUMENTS

| | | | | |
|---|---|---|---|---|
| 3,762,474 | A | * | 10/1973 | Allen ................... E21B 43/168 |
| | | | | 166/250.01 |
| 3,856,468 | A | * | 12/1974 | Keller ............................ 436/27 |
| 4,090,398 | A | * | 5/1978 | Deans .................... E21B 49/00 |
| | | | | 166/250.16 |
| 4,373,586 | A | * | 2/1983 | Hunt, III ...................... 166/402 |
| 4,488,602 | A | | 12/1984 | Lepper |
| 5,111,882 | A | * | 5/1992 | Tang et al. ................. 166/252.6 |
| 5,168,927 | A | * | 12/1992 | Stegemeier et al. ....... 166/252.6 |
| 5,381,863 | A | * | 1/1995 | Wehner ................ E21B 43/164 |
| | | | | 166/268 |
| 5,725,054 | A | | 3/1998 | Shayegi et al. |
| 5,968,354 | A | | 10/1999 | Brinkley |
| 6,305,472 | B2 | | 10/2001 | Richardson et al. |
| 7,186,673 | B2 | * | 3/2007 | Varadaraj et al. ............ 507/200 |
| 8,100,178 | B2 | * | 1/2012 | Bragg et al. .................. 166/275 |
| 2007/0267193 | A1 | * | 11/2007 | Hills et al. .................... 166/264 |
| 2008/0236845 | A1 | | 10/2008 | Morrow et al. |
| 2009/0118143 | A1 | | 5/2009 | Hinkel et al. |
| 2010/0006283 | A1 | * | 1/2010 | Collins et al. ................ 166/261 |
| 2011/0036580 | A1 | * | 2/2011 | Morrow .................. C09K 8/58 |
| | | | | 166/305.1 |

* cited by examiner

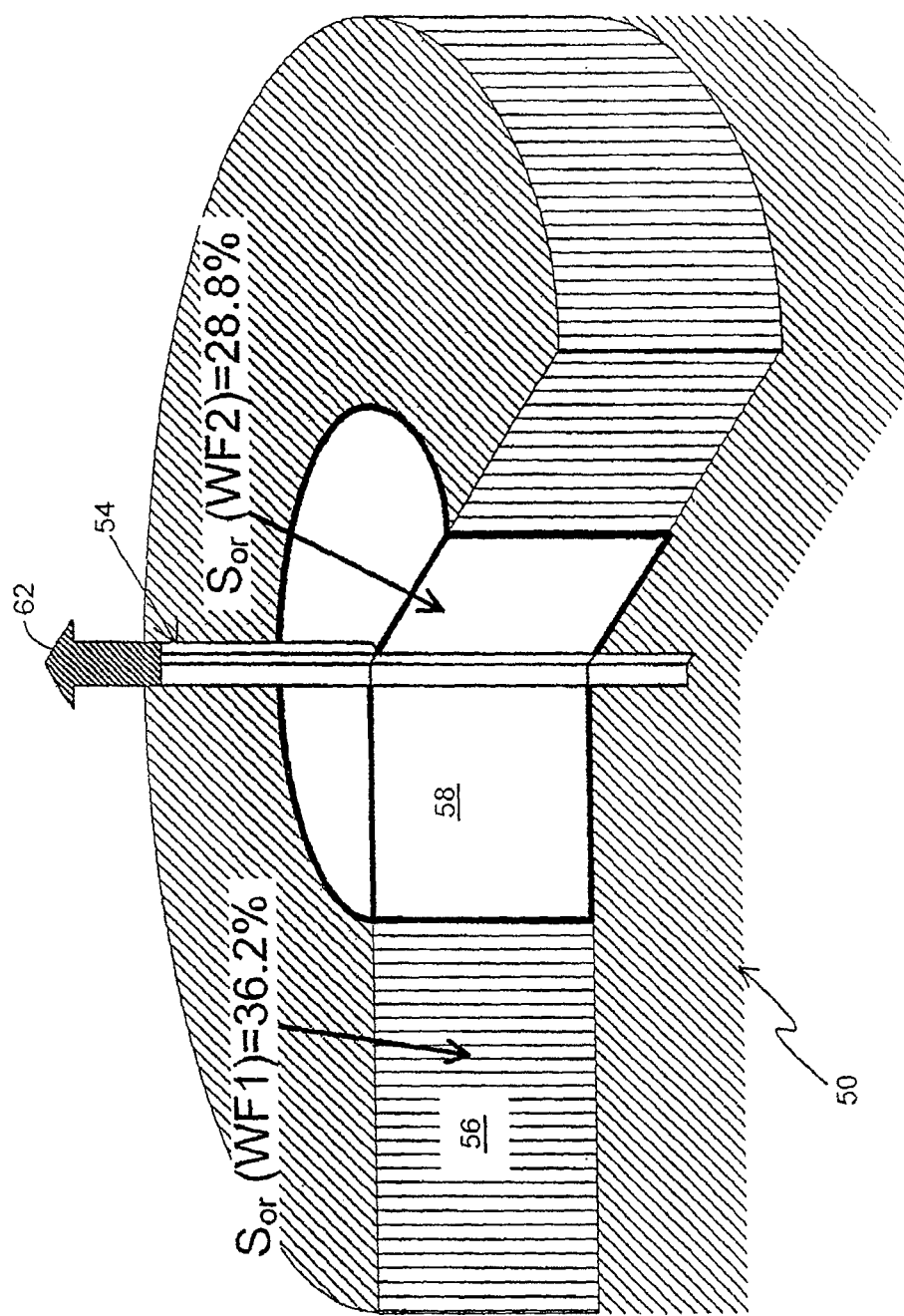

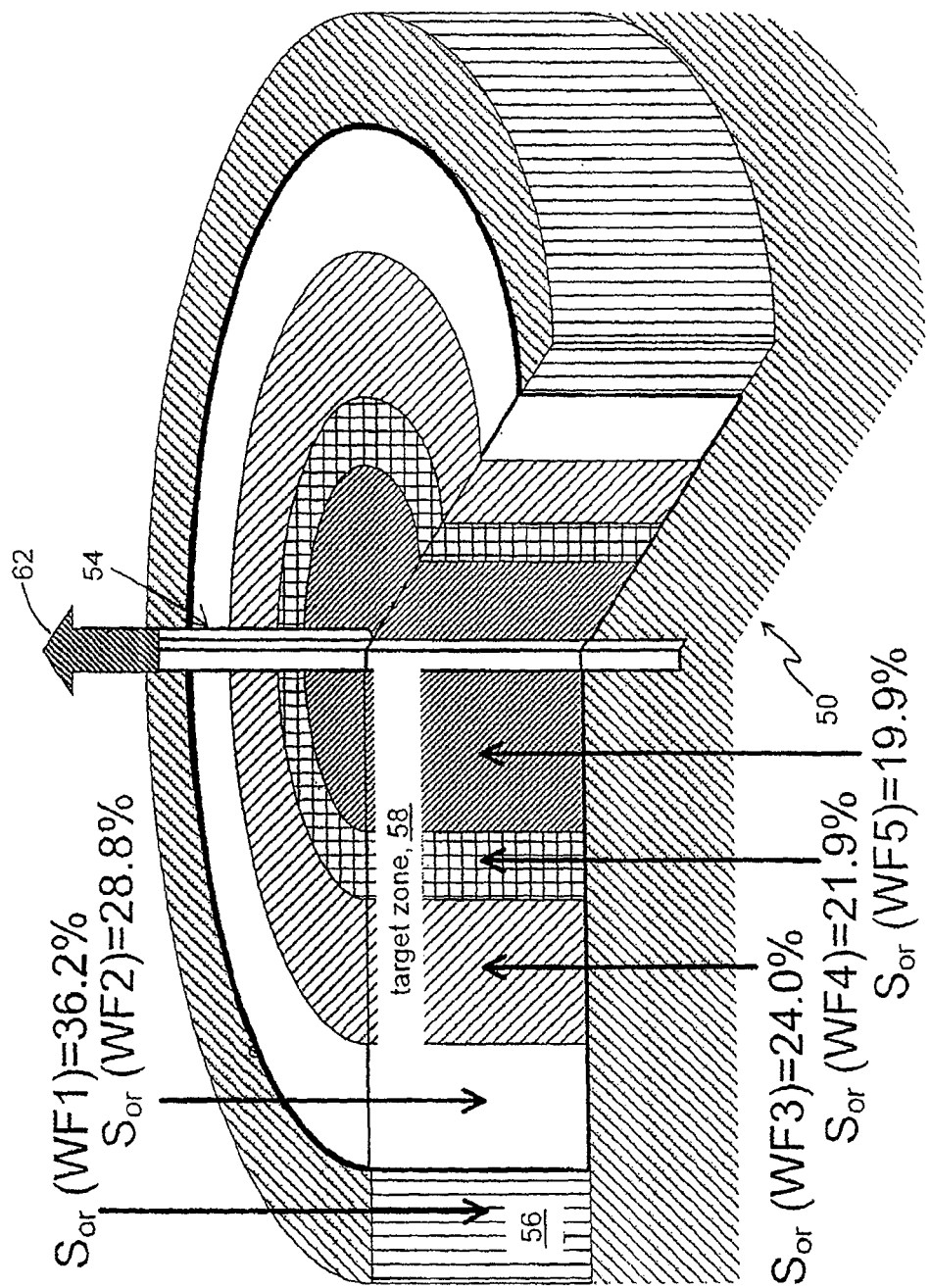

SINGLE-WELL DIAGNOSTICS AND INCREASED OIL RECOVERY BY OIL INJECTION AND SEQUENTIAL WATERFLOODING

RELATED CASES

This application is the U.S. National Stage Patent Application of International Application No. PCT/US2010/42299, filed on Jul. 16, 2010, which claims the benefit of U.S. Provisional Patent Application No. 61/226,709 for "Single-Well Diagnostics and Increased Oil Recovery by Oil Injection and Sequential Waterflooding" by Norman R. Morrow et al., which was filed on Jul. 18, 2009, the disclosure and teachings of which are hereby incorporated by reference herein.

FIELD OF THE INVENTION

The present invention relates generally to enhancing oil recovery from underground reservoirs and, more particularly, to increasing oil recovery from previously waterflooded reservoirs, or from an oil reservoir or zone of an oil reservoir which contains immobile oil at the time of discovery, by single-well recharging of reservoir pore spaces with oil followed by re-waterflooding and oil recovery.

BACKGROUND OF THE INVENTION

About one-half of oil recovery worldwide is produced by waterflooding. Typically, more than one-half of the original oil in place remains in the reservoir after waterflooding and is the target for additional oil recovery processes. For reservoirs having been waterflooded to where the fraction of oil in the produced water is low, for example, less than 1%, keeping the well in production may only be barely economical. Such wells are commonly described as stripper wells. A large fraction of current production in the contiguous United States comes from stripper wells. For practical purposes the quantity of residual oil, often referred to as trapped oil, around the well bore is almost stable.

The injection of discrete volumes of fluid in a reservoir recovery process application is known. For example, in the Water Alternating Gas (WAG) process, one tenth of the reservoir hydrocarbon volume may be injected over a period of a year with cycles of one month of carbon dioxide injection followed by water injection for one month. However, significant quantities of oil remain in the reservoirs after primary and secondary recovery.

Laboratory studies have shown that when oil is recovered by waterflooding and at least a portion of the swept volume is recharged with oil, higher recovery is obtained when the recharged volume is swept by water a second time. Further cycles of recharging with oil and waterflooding may lead to yet additional oil recovery. Data for four sequential waterfloods leading to improved oil recovery have been reported (See, e.g., "Oil Recovery by Sequential Waterflooding with Oil Reinjection and Oil Relocation," by Norman R. Morrow et al., International Publication No. WO 2009/126663, 15 Oct. 2009.), the disclosure and teachings of which are hereby incorporated by reference herein.

Measurement of residual oil and reduction in residual oil saturation has been demonstrated using the single well tracer test (SWTT) (See, e.g., McGuire et al. SPE 2005.). The SWTT for determination of residual oil typically investigates a region having a radius of 15 to 30 feet. The test involves injection of about 50 to 500 bbls of an aqueous solution containing the tracer. The actual volume generally depends on how much material can be injected in one day as determined by reservoir properties. This criterion is known from experience to give the best results for the SWTT. The tracer partitions between the residual oil and the aqueous phase, and the residual oil may be determined from separation between the partitioning tracer and a second tracer that remains in the aqueous phase (See, e.g., J. F. Tomich et al., "Single-Well Tracer Method to Measure Residual Oil Saturation," Journal of Petroleum Technology (February 1973) 211-218.).

SUMMARY OF THE INVENTION

Accordingly, it is an object of the present invention to provide a method for single-well recovery of immobile residual oil from a previously waterflooded reservoir, or from an oil reservoir or zone of an oil reservoir which contains immobile oil at the time of discovery.

Another object of the invention is to provide a method for single-well recovery of immobile residual oil from a previously waterflooded reservoir, or from an oil reservoir or zone of an oil reservoir which contains immobile oil at the time of discovery, at various reservoir scales.

Yet another object of the invention is to provide a method for single-well determination of the amount of immobile residual oil recovered from a previously waterflooded reservoir, or from an oil reservoir or zone of an oil reservoir which contains immobile oil at the time of discovery.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

To achieve the foregoing and other objects, and in accordance with the purposes of the present invention, as embodied and broadly described herein, the method for recovering residual oil from a previously waterflooded reservoir, or from an oil reservoir or zone of an oil reservoir which contains immobile oil at the time of discovery, hereof, includes the steps of charging the region in the vicinity of a well with a volume of oil; and producing the well to recover injected oil plus reservoir residual oil.

In another aspect of the invention, and in accordance with its objects and purposes, the method for recovering residual oil from a previously waterflooded reservoir, hereof, includes the steps of: charging the region in the vicinity of a well with a volume of oil; displacing the oil away from the well by injection of water, whereby the volume of the oil bank formed thereby increases as the residual oil behind the displaced oil bank is reduced; and producing the well such that the oil bank moves back towards the well with further increase in volume as a result of further reduction in oil saturation behind the oil bank.

Benefits and advantages of the present invention include, but are not limited to, providing a method for increasing oil recovery from reservoirs at all stages of development, including mature reservoirs producing at high water-to-oil ratios, using a single well for waterflooding and oil recharging, and for production. Additionally, testing of the results of waterflooding and oil recharging at a single well may be used for reservoir diagnostics including evaluation of the procedure for multi-well field-wide use for wells in the vicinity of the test well.

Either of these methods or a combination of thereof, may be repeated to obtain additional recovery through further reduction in residual oil by sequential injection of oil and brine to generate multiple oil banks, which are then produced. As will be described hereinbelow, effects of reservoir heterogeneity are largely cancelled when single-well procedures are employed.

BRIEF DESCRIPTION OF THE DRAWINGS

The accompanying drawings, which are incorporated in and form a part of the specification, illustrate the embodiments of the present invention and, together with the description, serve to explain the principles of the invention. In the drawings:

FIG. 5C is a simulation of a schematic representation of the residual saturation, $S_{or}$, at 28.8%, after production of the well.

FIG. 7 is a schematic representation of the calculated residual oil distribution in a well after oil production from the generation of two oil banks.

DETAILED DESCRIPTION OF THE INVENTION

Figure 1:
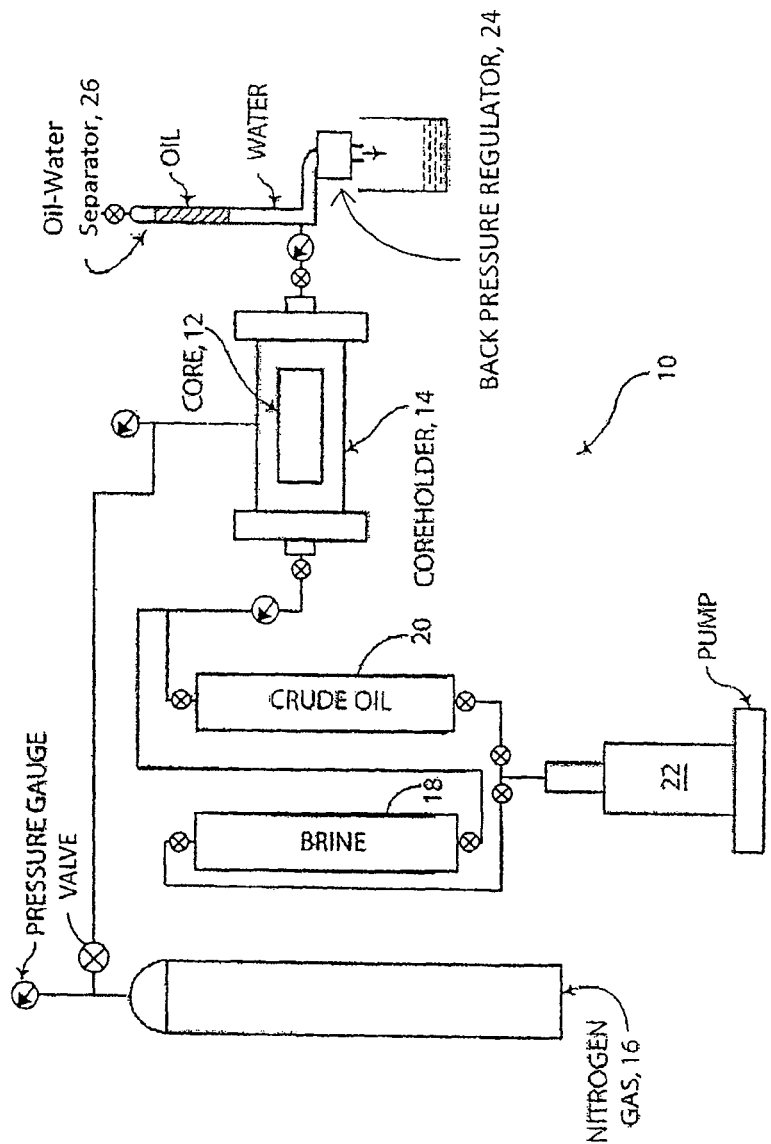
FIG. 1 is a schematic representation of the apparatus used for core cleaning, establishing initial water saturation in a core, and for oil and water flooding of a core for demonstrating embodiments of the method of the present invention on a laboratory scale.

Briefly, the present invention includes a method for improving oil recovery from reservoirs by reducing the residual oil saturation of oil trapped in an oil reservoir such that overall recovery is improved. The invention may be adapted to wells where the local oil saturation has different levels of mobility. In accordance with embodiments of the present invention, oil recovery may be improved by recharging the region around a previously waterflooded production or injection well with oil followed by recovery of the injected oil plus oil that was present in the reservoir after the initial waterflooding and prior to the oil injection. Oil injection may be followed by injection of water which pushes the injected oil away from the well bore to form a growing oil bank since, as a result of the second waterflooding, the residual oil in the volume swept by the oil bank is lower than the residual oil ahead of the oil bank. If the well is placed in production, a third waterflooding occurs in the direction of the well bore from water already present in the reservoir, whereby water and a large fraction of the oil bank may be brought to the surface. Multiple sequences of injection of oil and water generate multiple oil banks which increase the number of times the reservoir is swept. Oil displaced by waterflooding of at least a portion of the reservoir prior to the oil recharging and waterflooding cycles of the present invention may be used to recharge the portion of the reservoir around the well in accordance with the teachings of embodiments of the present invention.

Laboratory tests by the present inventors and described hereinbelow, have shown that if a core is recharged with oil, rather than reproducing the original production curve of oil recovery versus pore volumes of water injected, the oil recovery achieved by waterflooding increases significantly. Furthermore, if cycles of oil and water injection are performed, there is a sequential increase in oil recovery. These results have been observed in tests with reservoir sandstone, outcrop sandstone, outcrop carbonate cores, and other rock types for a range of initial water saturations and crude oils.

As also described hereinbelow, laboratory testing by the present inventors has shown that residual oil recovery can be substantially improved by extending the period of time between establishment of residual oil saturation and the time of injection of oil; that is, extended time (aging) between the original establishment of residual oil saturation by waterflooding and the time of oil injection, as will commonly occur in practice, is advantageous to recovery. Conversely, extended aging at re-establishment of initial water saturation can generate reduced recovery for the next waterflood; that is, the effect of aging at low water-saturation indicates that there is an advantage in minimizing the time between injection of oil and the commencement of the displacement of injected oil by waterflooding.

Volumetric material balances have been confirmed by laboratory testing using tracers, and an imaging technique using heavy water to image the distribution of oil saturation has been used to observe the reduction in residual saturation due to sequential waterflooding by investigation of the rock pore spaces. Such testing has confirmed that sequential waterflooding and oil recharging results in the reduction of residual oil, with the magnitude of these reductions being consistent with those measured by material balance. Produced oil and water may be tested to determine reservoir conformance and to determine the proportion of the injected brine and the injected oil contained in the produced water and oil. Successful response to waterflooding is usually taken as evidence of conformance and, more particularly, the ability to inject brine into a well and recover the brine by production of that well is evidence of flow conformance. Residual oil saturation may also be determined. Such information is beneficial in the determination of whether further cycles might be economically viable, and as a reservoir diagnostic, including its use as an alternative or supplement to routine laboratory testing of oil recovery.

Although sequential water flooding based on laboratory observations has been proposed by the present inventors as a method of enhanced oil recovery after initial waterflooding (See, e.g., "Oil Recovery by Cyclic Waterflooding of Mixed-Wet Sandstone and Limestone" by N. Loahardjo et al., the 10th International Symposium on Reservoir Wettability, Abu Dhabi, UAE (October 2008).), the present invention includes improved oil recovery by application of sequential waterflooding and oil recharging at the same well. The invention can be adapted to wells where the local oil saturation has different levels of mobility. A variety of production schemes may be used for recovering the injected oil plus additional oil from the formation (See, e.g., N. Loahardjo et al., supra.). Effectiveness at different reservoir scales may be measured by a combination of material balance, chemical tracers, and other techniques, again at an individual well site.

"Reservoir," as the term is used herein, refers to reservoirs at various stages of development from early production to mature reservoirs that have been waterflooded close to or at their economic limit, and are producing at high water-to-oil ratios. The term reservoir may include reservoirs that are used for underground oil storage, including the storage of strategic oil reserves and also includes oil reservoirs or zones of reservoirs which do not have mobility to the oil phase at the time of discovery. When crude oil is displaced from a rock formation by water, as is common practice in the process of oil recovery by waterflooding, laboratory tests show that changes in the crude oil/water/rock interactions occur.

As used herein, and in the terms "waterflood" and "waterflooding", the term "water" includes water containing salts and which is commonly referred to as brine, but without limitation on its salt concentration (and including pure water). Thus, improved oil recovery from oil reservoirs may also be achieved if the injection of water is followed by sequential injection and production of oil and water. This improvement in oil recovery is observed without changing the composition of the injected water, although variation in injected water composition may also yield improved oil recovery (See, e.g., "Salinity, Temperature, Oil Composition And Oil Recovery By Waterflooding" by G. O. Tang and N. R. Morrow, SPE Reservoir Engineering 12(4), 269-276 (November 1997); "Influence Of Brine Composition And Fines Migration On Crude Oil/Brine/Rock Interactions And Oil Recovery" by G. O. Tang and N. R. Morrow, J. Pet. Sci. Eng. 24, 99-111 (1999); "Effect of Wettability on Waterflood Recovery for Crude Oil/Brine/Rock Systems" by Jadhunandan, P. and Morrow, N. R., SPE Reservoir Engineering, February 1995, 10, (1) 40-46; "Effect of Brine Composition on Recovery of Moutray Crude Oil by Waterflooding" by H. O. Yildiz and N. R. Morrow, 1996, J. Pet. Sci. and Eng., 14, 159; and "Effect of Brine Composition on Wettability and Oil Recovery of a Prudhoe Bay Crude Oil" by H. O. Yildiz et al., 1999, J. Can. Pet. Tech., 38, 26).

The brine may contain additives such as surfactants and polymers effective for improving waterflooding efficiency.

As used herein, the term "oil" includes produced crude oil, produced crude oil having modified composition, or produced or modified produced crude oil with the addition of additives that promote crude oil recovery by improved microscopic displacement and vertical and areal sweep efficiency. The source of the injected oil is not restricted to produced oil from the target reservoir. The term oil also includes crude oil that naturally recharges into zones where the oil saturation has been reduced by sequential flooding.

In the following proof of principle for embodiments of the method of the present invention, materials were prepared as follows:

A. Oil:

The oil from a U.S. field was filtered to remove particulate matter and then vacuumed for 2 h at room temperature. Oil properties are set forth in TABLE 1:

TABLE 1

| | |
|---|---|
| $C_6$ asphaltenes, % weight | 6.3 |
| Acid #, mg KOH/g oil | 1.46 |
| Base #, mg KOH/g oil | 2.49 |
| API gravity | 23.57 |
| μ oil at 22° C., cP | 111.2 |
| μ oil at 60° C., cP | 20.1 |

B. Brines:

Synthetic seawater was prepared having the composition set forth in TABLE 2 hereof, and is hereinafter referred to as seawater or water. The water was degassed by vacuum for 2 h, and had a viscosity of about 0.6 cP at 60° C. In TABLE 2, $NaN_3$ is a biocide effective for inhibiting growth of bacteria, and TDS/L is the total dissolved solids per liter.

TABLE 2

| Composition [g/L] | Seawater |
|---|---|
| NaCl | 28 |
| KCl | 0.935 |
| $CaCl_2$ | 1.19 |
| $MgCl_2$ | 5.368 |
| $NaN_3$ | 0.1 |
| TDS/L | 35.493 |

C. Cores:

The origin of the cores, along with their lithologies, porosities (pore volumes) and permeabilities are set forth in TABLE 3. All cores were cylindrical with 1.5 in. in outer diameter and either 3 in. or 6 in. in length. The permeabilities were measured using nitrogen gas. Outcrop cores were cut and dried in an oven at 105° C.

TABLE 3

| Name | Lithology | Origin | Porosity, % | Permeability, milli-Darcy |
|---|---|---|---|---|
| Bth S01B | Sandstone | Outcrop | 23 | 1562 |
| Ev 2L 02 | Sandstone | Outcrop | 16 | 85 |

Reference will now be made in detail to the present embodiments of the invention, examples of which are illustrated in the accompanying drawings. In the Figures, similar structure will be identified using identical reference characters. Turning now to FIGURES, FIG. 1 is a schematic representation of apparatus, 10, used to demonstrate the method of the present invention on a laboratory scale. The apparatus was used for testing cores cut from various rocks, and for establishing initial water saturation thereof, charging with oil, and coreflooding, and is described in more detail in "Brine Composition And Waterflooding Recovery For Selected Crude Oil/Brine/Rock Systems," by G. Q. Tang, Ph.D. Thesis, University of Wyoming, May 1998.

Outcrop cores, 12, were cut from quarried blocks, placed in core holder, 14, and then oven dried. After drying, the permeability to nitrogen from gas source, 16, of each core was measured.

Each core was saturated with water, 18, as set forth in TABLE 2, hereinabove, and remained submerged in the same water for 14 days at room temperature to establish ionic equilibrium. The core was then flooded with 80 cc of the crude oil, 20, from one direction, and with 20 cc of the crude oil from the opposite direction using pump, 22, in order to establish initial water saturation at 60° C. The viscosity, p, of the oil was 28.8 cP at 60° C. After establishing initial water saturation by displacement with crude oil, the core was removed from the core holder and submerged in the crude oil to age at 75° C. for 14 days in a sealed vessel.

At discovery, some fraction of the pore space in a reservoir that contains oil also contains reservoir connate water. Reservoir water saturation is determinative of the fraction of oil in the reservoir pore space, and hence the reserves. As stated hereinabove, connate water is simulated by starting with cores saturated with brine and displacing the brine by flow of oil until the production of brine effectively ceases. The essentially immobile initial water saturation is referred to as $S_{wi}$. When oil is displaced by injection of water into a core at $S_{wi}$, the water gains mobility, but as the oil is displaced a fraction of the oil loses mobility and remains trapped in the rock. Such oil saturation after waterflooding is referred to as residual oil, $S_{or}$. In some situations, continued injection of water may result in oil production at a very low rate and, for most purposes, the oil may be described as residual oil. The definitions $S_{wi}$ and $S_{or}$ are principally operational.

After aging, a core was placed in core holder 14 and waterflooded at 3 ft/day. All waterfloods were performed at 60° C. with a back pressure of 20 psi maintained by back pressure regulator, 24, in line with the outflow of oil/water separator, 26. The temperature of $T_d$=60° C. was selected since reservoirs are often found at about this temperature. In practice, the injection water is raised to the reservoir temperature principally by contact with the reservoir. During waterflooding, the effluent oil and water volumes, and the pressure drop across the core were recorded.

Figure 2:
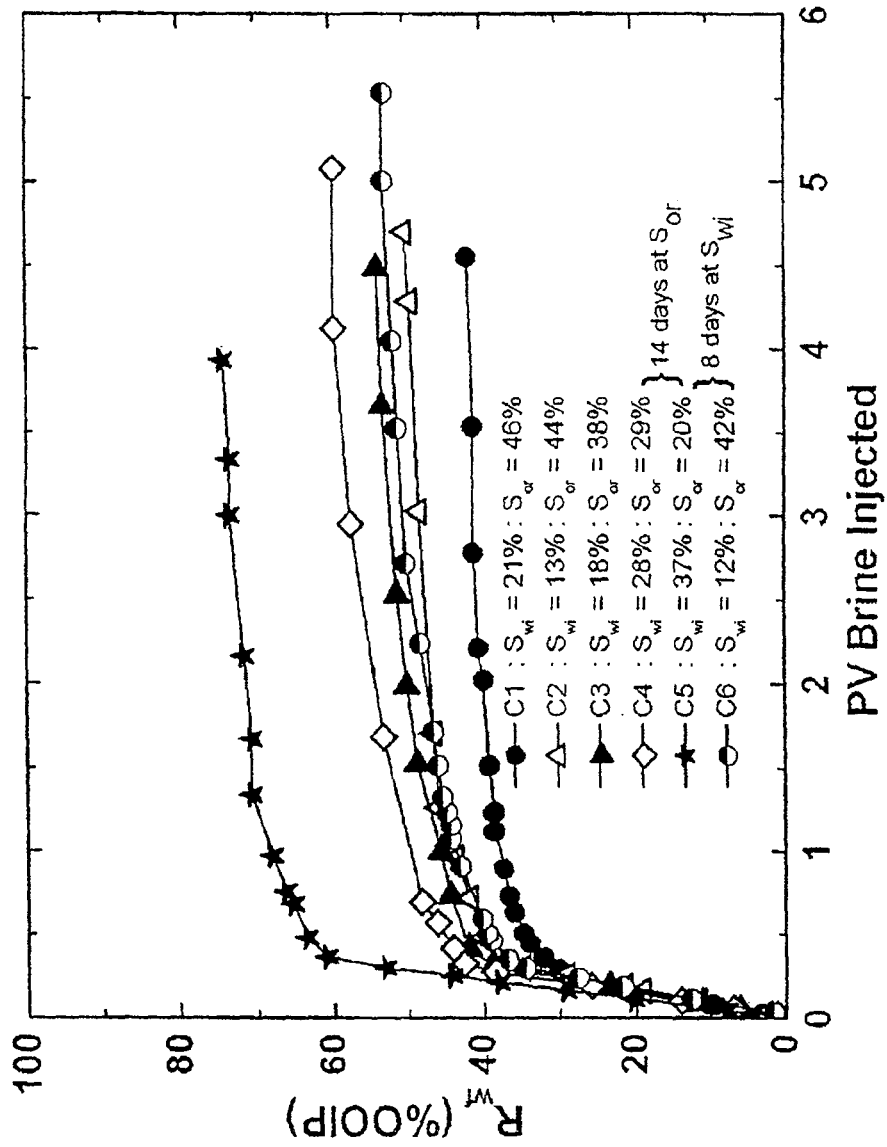
FIG. 2 is a graph of laboratory measurements of the percentage recovered of the original oil in place, $R_{wf}$ (% OOIP), as a function of the injected water in units of pore volume for a Bentheimer core.
Figure 3:
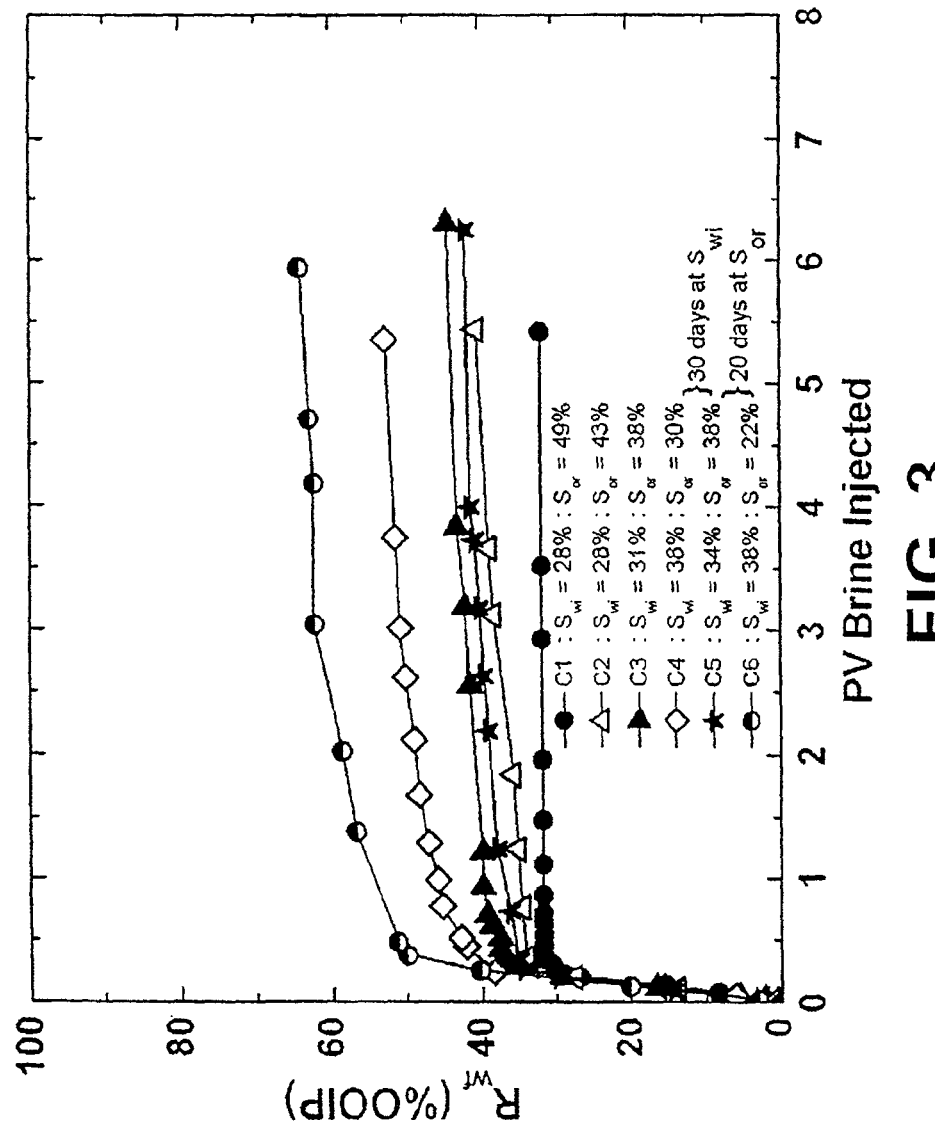
FIG. 3 is a graph of laboratory measurements of $R_{wf}$ (% OOIP), as a function of the injected water in units of pore volume at $T_d=60°$ C. for a low permeability sandstone core.

A cycle, $C_n$, where n=1-6, as described in the numbered curves of FIG. 2 and FIG. 3 is establishment of initial water saturation by flooding with oil, followed by flooding with water at the temperatures indicated hereinbelow. Tests on each core are identified according to the sequence of flood cycles.

FIG. 2 is a graph of the percentage recovered of the original oil in place (OOIP), $R_{wf}$ (% OOIP), as a function of the injected water in units of pore volume, PV, for a first Bentheimer core (Bth S01 B) at $T_a$ (the temperature at which the core was aged with crude oil at the initial water saturation)=75° C., $T_d$ (the temperature of the waterflood displacement)=60° C., $k_g$ (permeability to gas)=1.56 D, μ (viscosity of oil or water, as indicated)=28.8 cP, and $S_{wi}$ is the initial water saturation established by displacement with oil at 60° C.

Curve C1 of FIG. 2 was generated after initial water saturation was established at 60° C., the core then being aged at 75° C. for $t_a$ (the time of aging of the core with crude oil)=4 weeks, and waterflooded with seawater at $T_d$=60° C. (p=28.8 cP). Curve C2 was taken after curve C1, the initial water saturation being re-established by flooding with oil at 60° C., and the core subsequently waterflooded with seawater at 60° C. In Curves C3 and C4, the same procedure as for Curve C2 was repeated. Curve C5 was generated after curve C4 the core being aged at its residual oil saturation for 14 days at 60° C. before the initial water saturation was re-established by flooding with crude oil at 60° C. The core was subsequently waterflooded with seawater. After generating Curve C5, the core was aged at its initial water saturation for 8 days at 60° C.; the core was subsequently waterflooded with seawater to obtain Curve C6.

FIG. 3 is a graph of the percentage recovered of the original oil in place (OOIP), $R_{wf}$ (% OOIP), as a function of the injected water in units of pore volume, PV, for a first low permeability ($k_a$=84.9 mD) Berea sandstone core (Ev 2L 02) at $T_d$=60° C. (μ=28.8 cP), where $S_{wi}$ is the initial water saturation established by displacement with oil at 60° C. Curve C1 of FIG. 3, was generated after initial water saturation was established at 60° C., the core then being aged at $T_a$=75° C. for $t_a$=6 months, and waterflooded with seawater at 60° C. The initial water saturation was re-established by flooding with oil at 60° C., and the core subsequently waterflooded with seawater at 60° C. to obtain Curve C2. The same procedure as for Curve C2 was repeated to obtain curves C3 and C4. Initial water saturation was re-established and Curve C5 was taken by waterflooding with seawater after aging the core at its initial water saturation for 30 days at 60° C. The core was aged at its residual saturation for 20 days and then initial water saturation was re-established and the core was waterflooded with seawater to obtain Curve C6.

Figure 4:
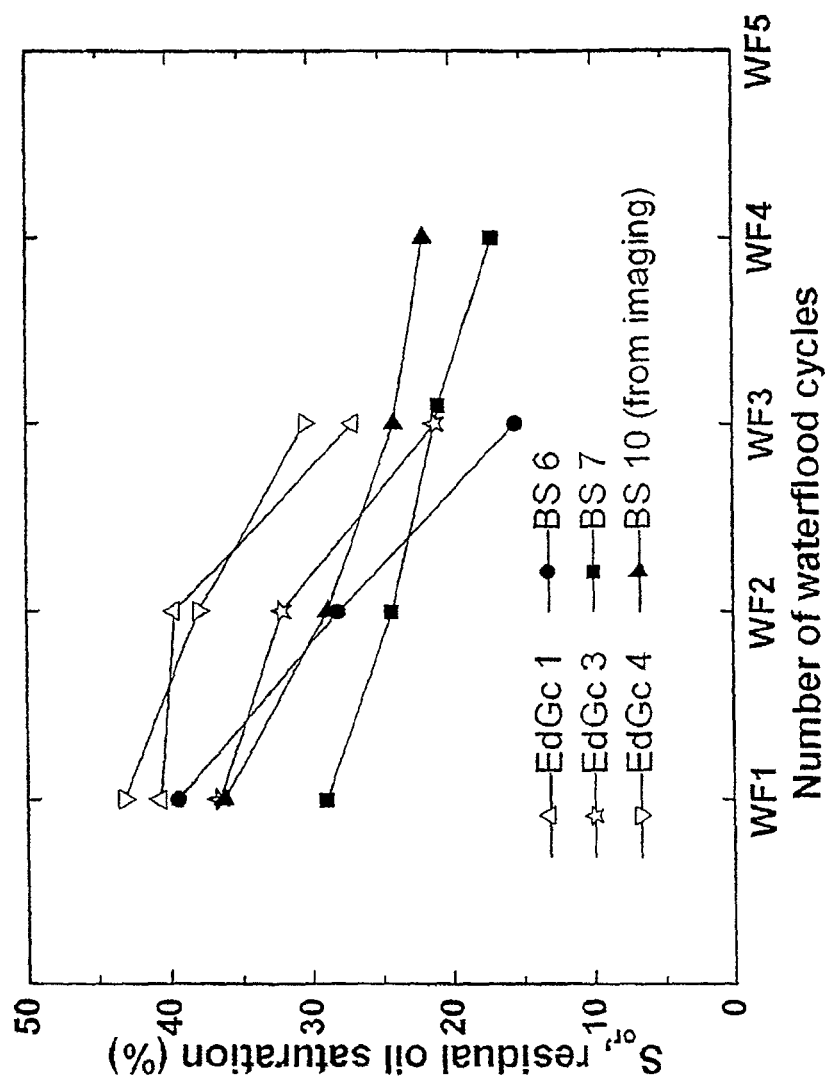
FIG. 4 is a graph of laboratory measurements for the residual oil saturation, $S_{or}$, as a function of the number of waterflood cycles for sequential waterflooding of sandstone and carbonate cores at elevated temperature.

FIG. 4 is a graph of the residual oil saturation, $S_{or}$, as a function of the number of waterflood cycles for sequential waterflooding of sandstone and carbonate cores at $T_d$=60° C. in the laboratory (See, e.g., N. Loahardjo et al., supra.). Data were also obtained using an imaging procedure. As shown in FIG. 4, the trend in the imaging data is consistent with other laboratory data shown in FIG. 4 which are based on oil recovery calculated by direct material balance. The values for reduction in oil saturation for Core BS 10 are used in the following discussion of sequential waterflooding.

Figure 5A:
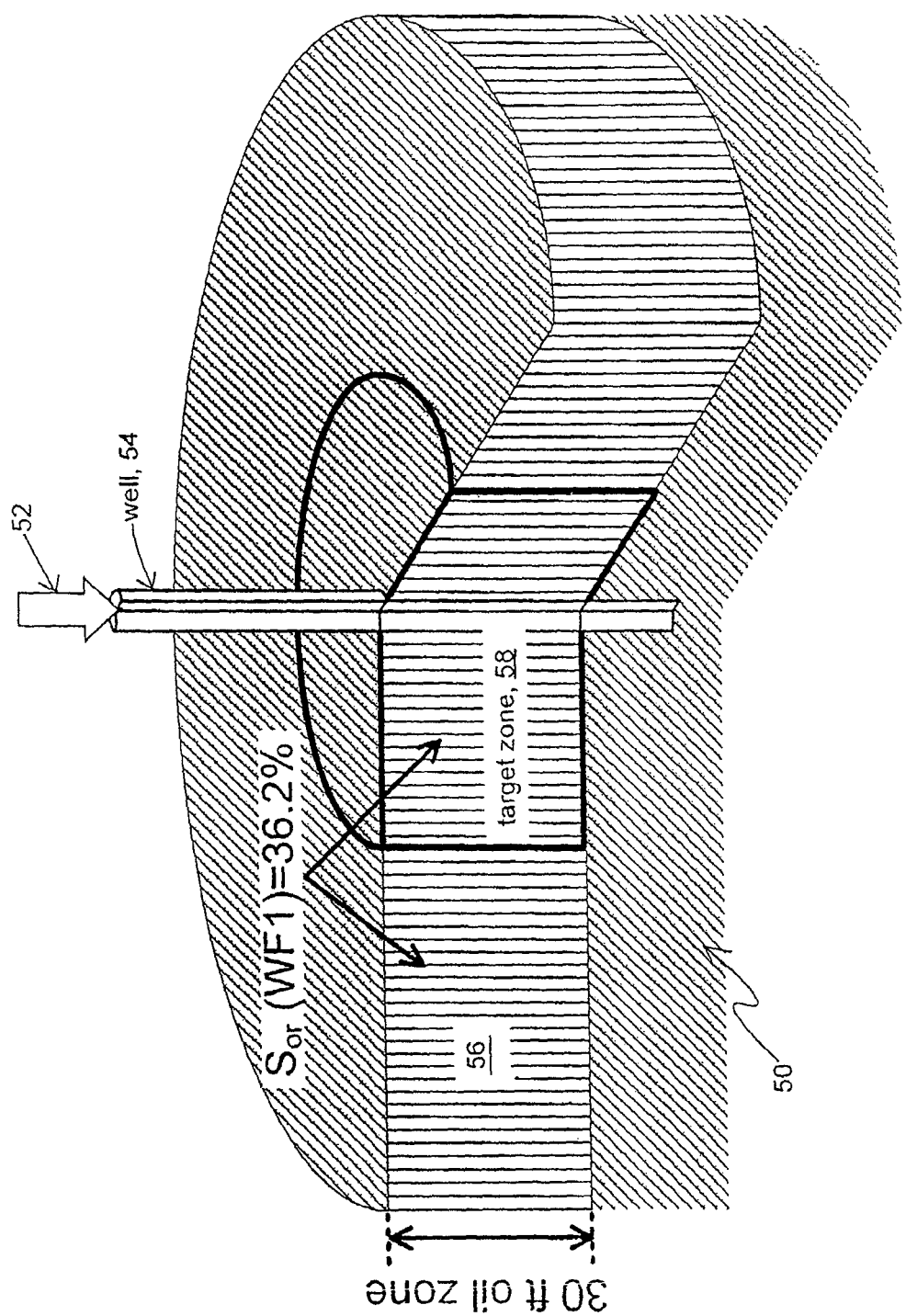
FIG. 5A is a schematic representation of a reservoir simulation at residual oil saturation, $S_{or}$, of 36.2% resulting from initial waterflooding (WF1)
Figure 5B:
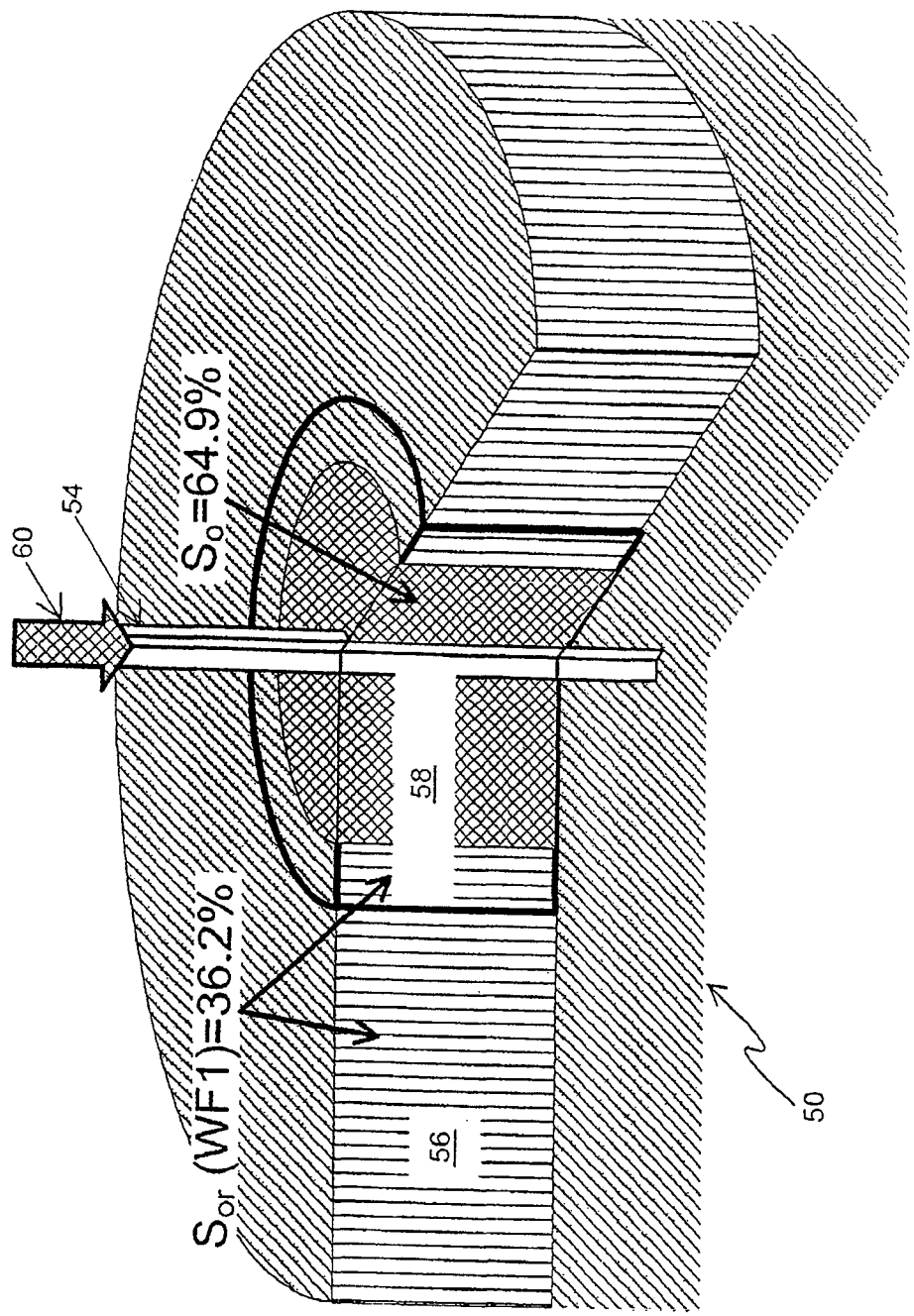
FIG. 5B is a schematic representation of a simulated injection of oil into the previously waterflooded well, bringing the oil saturation level to 64.9%.

FIG. 5A is a schematic representation of simulated reservoir, 50, at residual oil saturation, $S_{or}$=36.2% resulting from initial waterflooding (WF1), 52, from well, 54, where the porosity is assumed to be 20.9%, and the thickness of the oil zone, 56, is assumed to be 30 feet. Target zone, 58, the zone from which oil will be recovered, is assumed to have a radius of 10 feet. FIG. 5B is a schematic representation of a simulated injection of oil, 60, into target zone 58 of previously waterflooded zone 50 which may produce at low oil-to-water ratios, bringing the oil saturation level to 64.9%. Invasion of the formation by oil is assumed to be radial; in practice, however, flow patterns depend upon reservoir conformance. FIG. 5C is a simulation of a schematic representation of the residual saturation, $S_{or}$=28.8%, after production, 62, of well 54, the amount of additional oil produced being related to the difference between $S_{or}$ (WF1) and $S_{or}$ (WF2) in re-waterflooded target zone 58 corresponding to the reduction in residual oil in the re-swept region behind the oil bank (an oil bank is defined as a region containing oil at sufficiently high saturation that the oil is well-connected and mobile). Production may be achieved, for example, by pumping 62 the injected oil back out through well 54, the water contained in reservoir 50 now providing the water for the re-waterflood (WF2) so that reservoir water displaces the oil bank towards well 54. The values of the two-stage reductions in residual oil saturation by sequential waterflooding (WF2 and WF3) are based on laboratory imaging observations shown in FIG. 4, hereof.

Figure 6A:
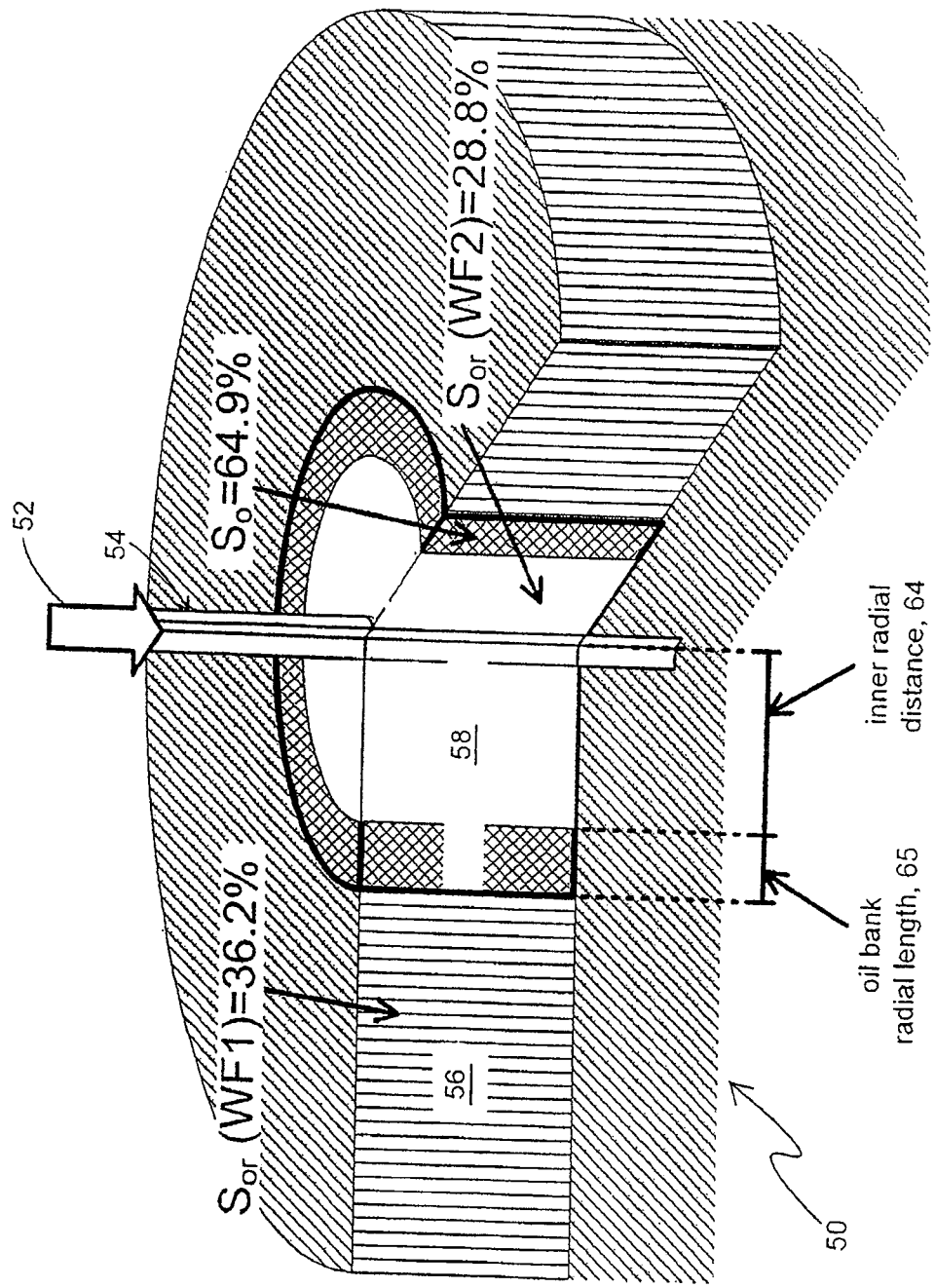
FIG. 6A is a schematic representation of a simulated reservoir having a residual oil saturation, $S_{or}$, of 36.2% after first waterflood (WF1), rising to 64.9% after injection of oil in a similar manner to that shown in FIG. 5B, hereof, and falling to 28.8% after injection of brine into the formation in second waterflood (WF2) which pushes the injected oil as a bank away from the centrally located well bore.
Figure 6B:
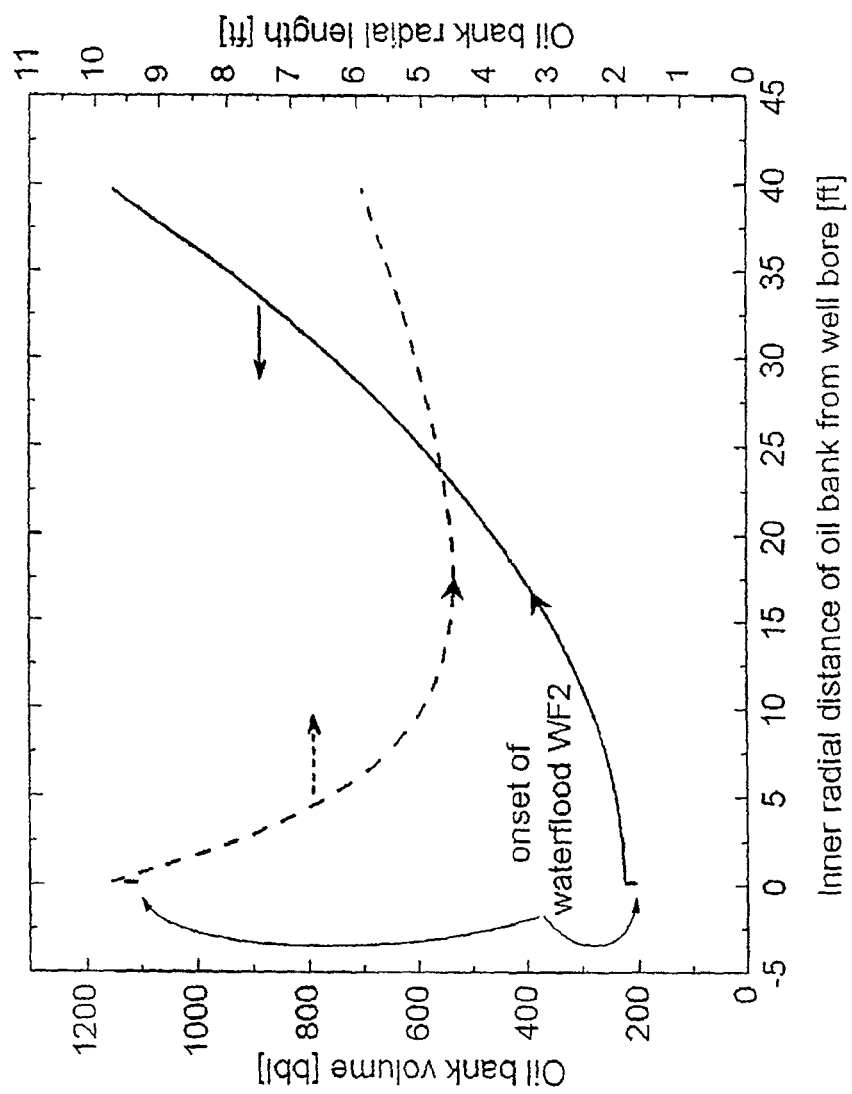
FIG. 6B is a graph of the calculated volume of the oil bank as a function of the inner radial distance from the well bore, and a graph of the radial length of the oil bank as a function of the inner radial distance of the oil bank from the well bore.
Figure 6C:
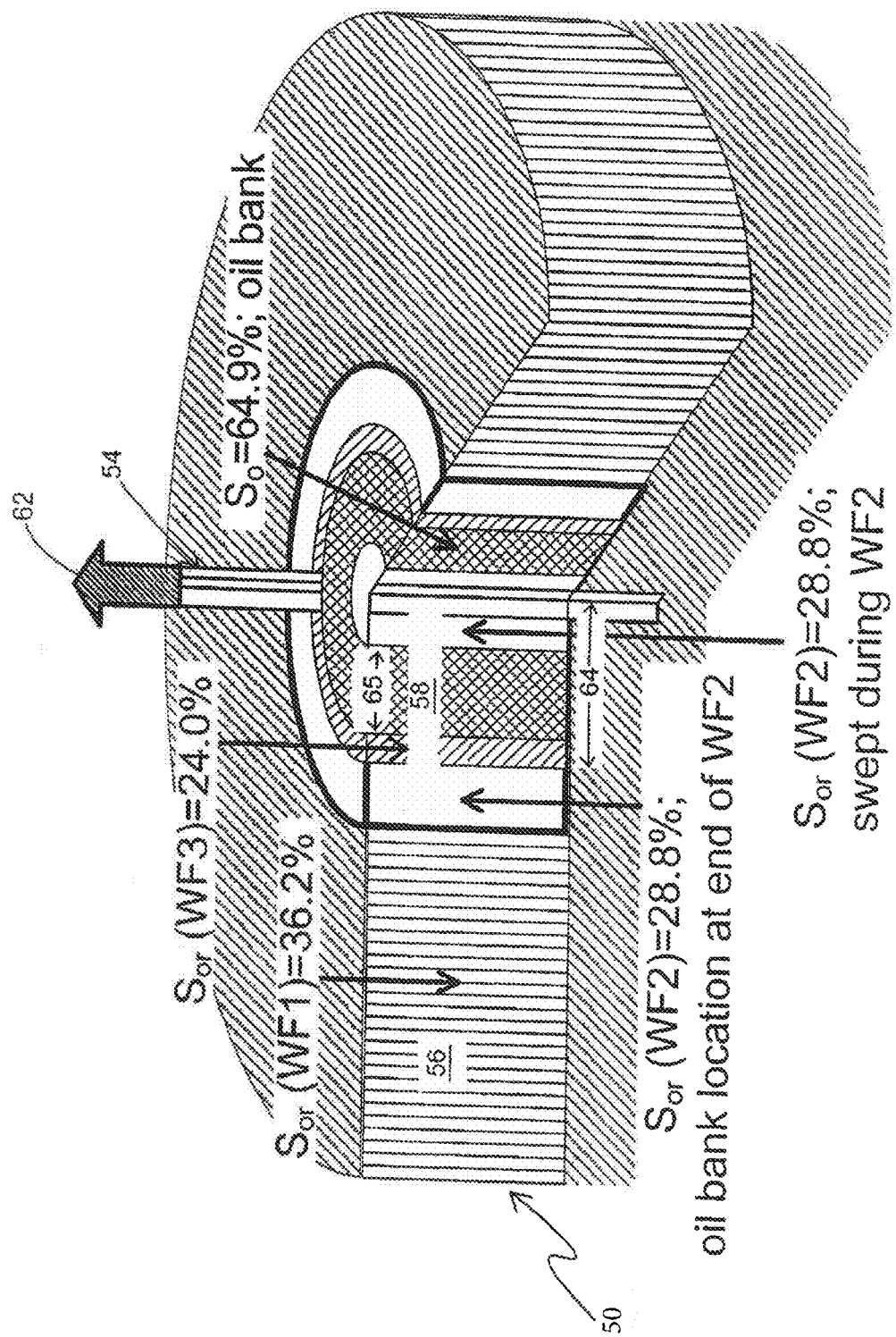
FIG. 6C is a schematic representation of the simulated well of FIG. 6A placed in production through the well bore.
Figure 6D:
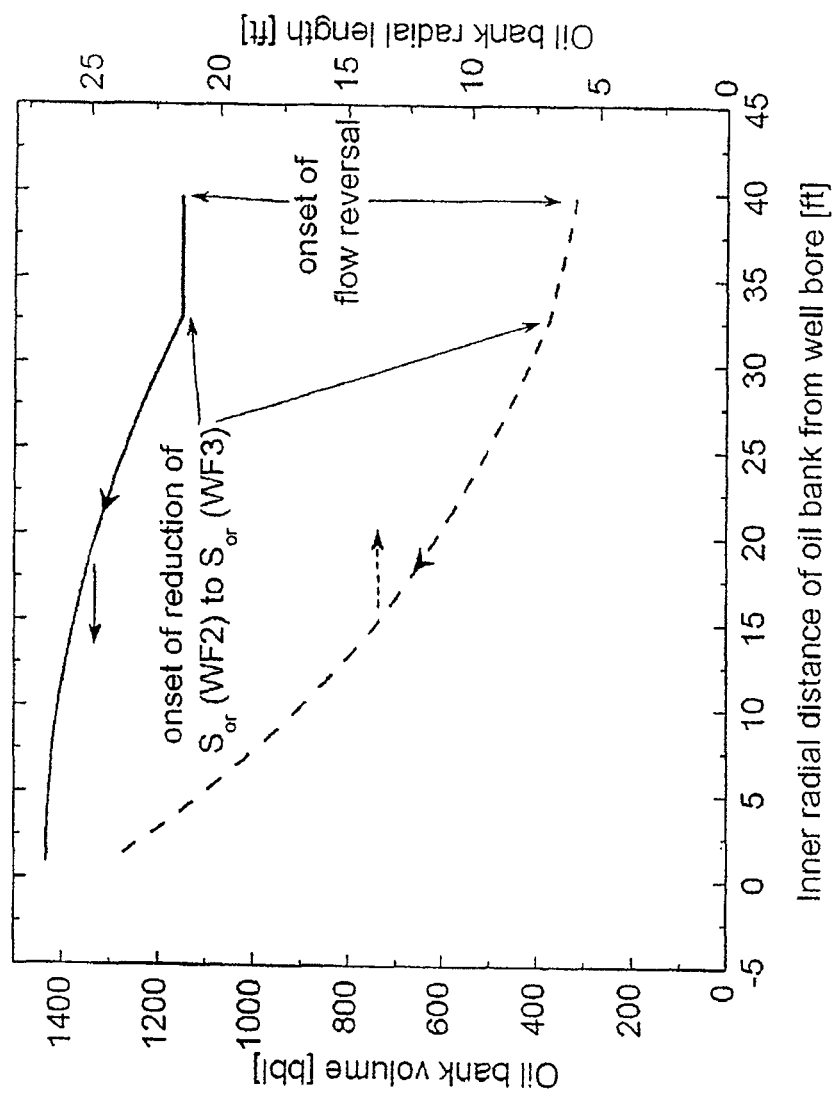
FIG. 6D is a graph of the calculated oil bank volume and the calculated oil bank radial length as a function of the inner radial distance of the oil bank from the well bore.
Figure 6E:
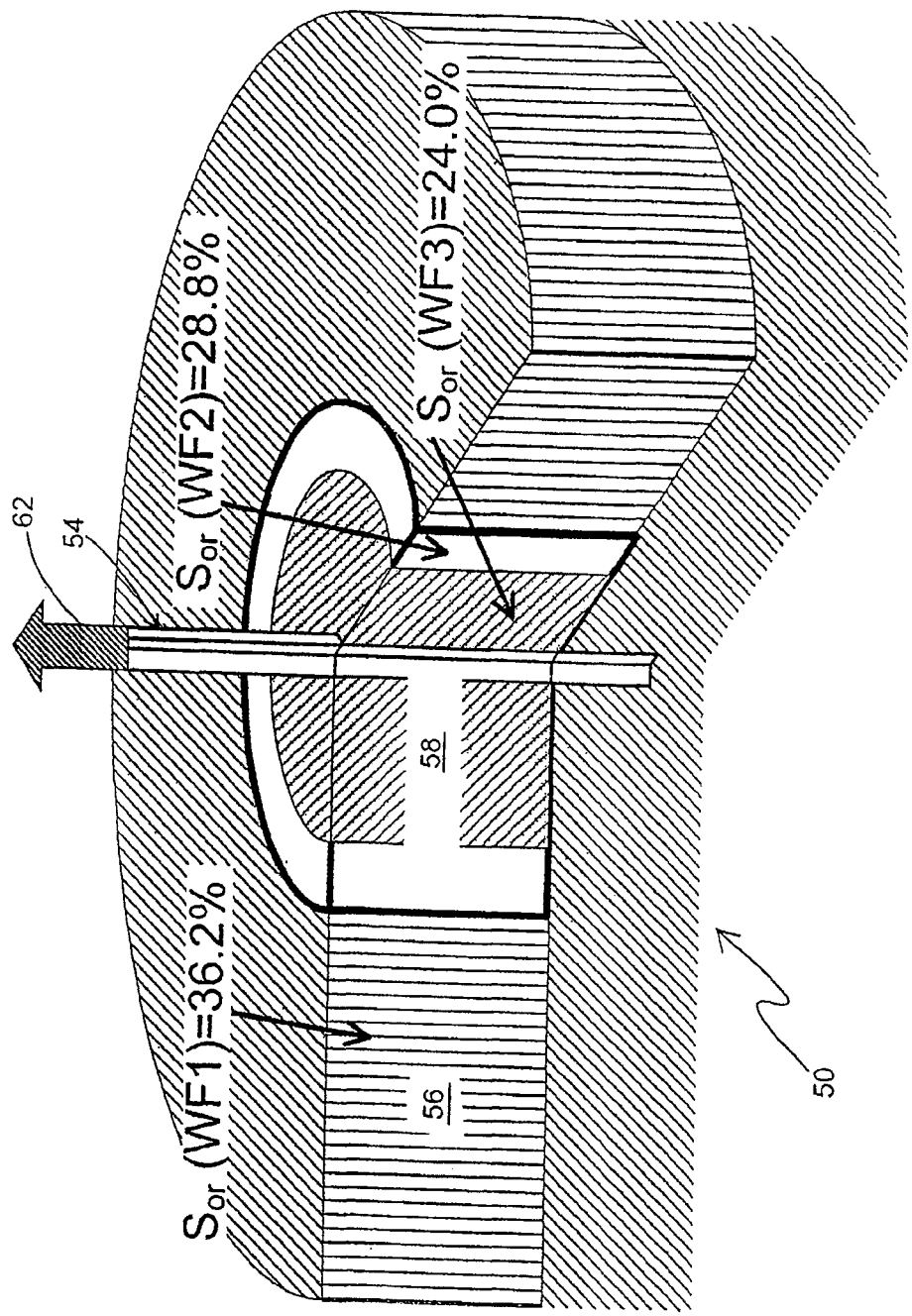
FIG. 6E is a schematic representation of a well showing the calculated distribution of residual oil after oil production.
Figure 6F:
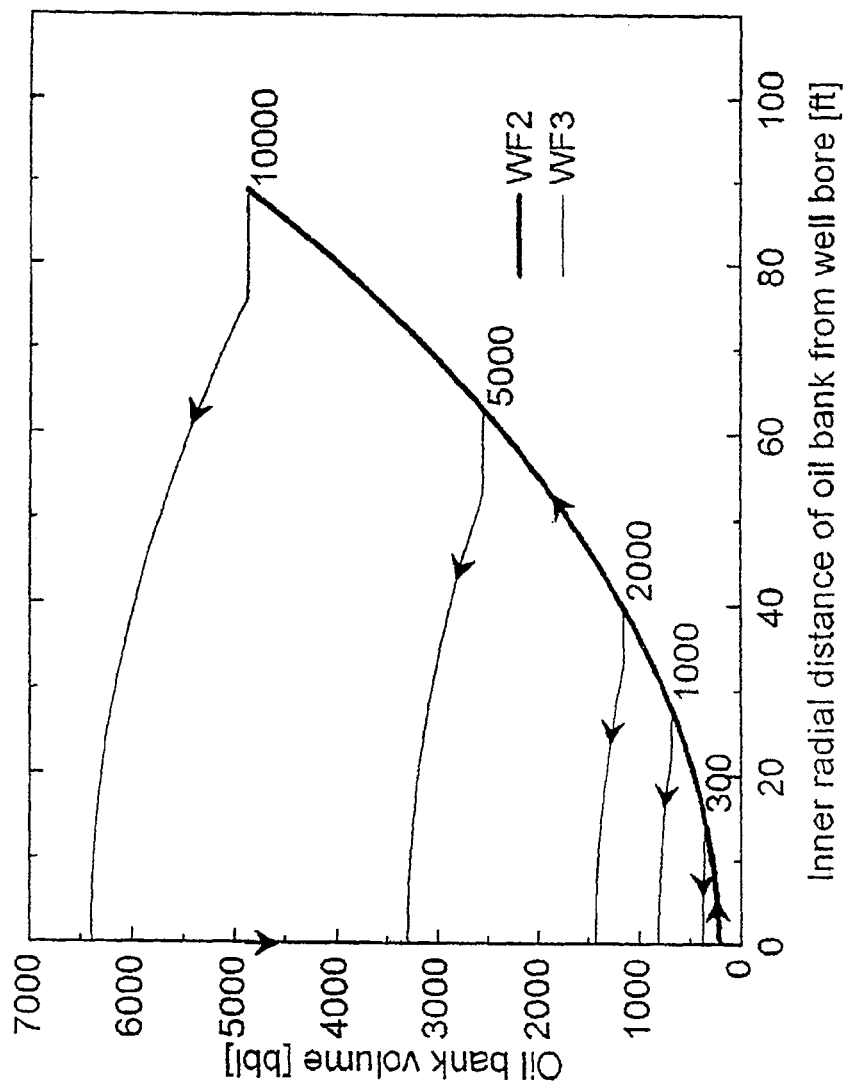
FIG. 6F is a graph of the calculated oil bank volume as a function of the inner radial distance of the oil bank from the well bore.

FIG. 6A is a schematic representation of simulated reservoir 50 having a residual oil saturation, $S_{or}$=36.2% after first waterflood (WF1), rising to 64.9% after injection of oil as shown in FIG. 5B, hereof, and falling to 28.8% after injection of brine 52 into the formation in second waterflood (WF2) which pushes the injected oil as a bank having radial distance, 64, away from centrally located well bore 54 into target zone 58 (assumed to have a radius of 46 feet and a thickness of 30 feet), and a radial length, 65. FIG. 6B is a graph of the calculated volume of the oil bank as a function of the inner radial distance 64 from well bore 54, and a graph of the calculated radial length of the oil bank as a function of the inner radial distance of the oil bank from the well bore, the oil bank growing in volume as the inner radius increases, while radial length 65 passes through a minimum before increasing with the volume of injected brine. The radial length of the bank of oil is at first diminished because of geometric effects, but then grows slowly with increasing distance from the wellbore because the residual oil saturation behind the bank has been reduced. For these calculations, $S_{or}(WF1)=36.2\%$, $S_{or}(WF2)=28.8\%$, and 100 bbl of oil is injected followed by 2000 bbl of water. FIG. 6C is a schematic representation of the simulated well of FIG. 6A placed in production 62 through the well bore such that reservoir brine displaces the oil bank towards the well. FIG. 6D is a graph of the calculated oil bank volume and the calculated oil bank radial length as a function of the inner radial distance 64 of the oil bank from well bore 54. There is a period where the residual oil saturation behind the bank is equal to the residual oil saturation ahead of the bank (that of waterflood WF2) as indicated in FIG. 6C and shown in FIG. 6D. After this period, the oil bank grows larger, as shown in FIG. 6D, and the residual saturation behind the bank decreases to that of waterflood WF3. The bank continues to increase in volume and radial length as it approaches the wellbore in accordance with the reduction in residual oil in the re-swept region behind the bank to $S_{or}$(WF3)=24.0% from $S_{or}$=28.8%. The radial length of the bank increases as shown in FIG. 6D because of the combination of additional oil in the bank and geometric effects. FIG. 6E is an illustration of the distribution of residual oil remaining in the reservoir after production 62 of oil from the oil bank. FIG. 6F shows the calculated volume of the oil bank as a function of the calculated inner radial distance from the well for injection of 100 bbl of oil followed by 300, 1000, 2000, 5000, and 10,000 bbl of water. The volume of the bank increases with the volume of water injected and increases as the oil bank returns to the well. The oil produced is equal to the volume of the bank minus the oil that is retained as residual saturation to waterflood WF3.

FIG. 7 is an example of the calculated reduction in residual oil when 50 bbl of oil are injected, followed by 1000 bbl of water, followed by another 50 bbl of oil and an additional 1000 bbl of water, and production of the well to yield residual oil saturations in target zone 58 (assuming a target zone radius of 46 feet and a thickness of 30 feet) ranging from $S_{or}$=28.8% for waterflood WF2 to $S_{or}$=19.9% for waterflood WF5.

Application of sequential flooding in single wells, then, includes injecting an oil volume followed by injection of water. Injection of water causes the oil to advance as a bank into the formation. Because sequential flooding causes reduction of residual oil behind the oil bank, the volume of the oil bank will grow as it moves away from the wellbore. Because of geometric effects, the distance between the inner and outer radius of the bank, referred to hereinabove as the radial bank length, will at first decrease. After passing through a minimum, the thickness of the oil bank will grow with distance from the well bore provided the integrity of the oil bank is maintained. This stage of waterflooding is described as waterflood WF2 in FIG. 6B, hereinabove.

At a selected total injected volume (oil plus water), the well may be placed in production, whereby the oil bank is drawn back towards the wellbore. Based on laboratory observations, the second displacement of the oil bank by water, pushes the oil bank toward the production well, and will result in further increase in the bank volume because the reversal of the direction of waterflooding causes further reduction in residual oil. The reversal of flow within the single well amounts to a second sequential waterflood and is described as waterflood WF3, in FIGS. 6C-6F hereinabove.

The SWTT may be applied to test for reduction in residual oil in the vicinity of the same wellbore after each step or after several steps of sequential waterflooding. The SWTT is first applied to a production well to determine the original post waterflood residual oil saturation. The SWTT test is next used to determine the $S_{or}$ remaining in the flooded formation after application of one or more of the sequential flooding processes described below.

As for most types of enhanced recovery processes, application of sequential flooding is most effective when applied to wells that exhibit flow conformance. Successful response to waterflooding is usually taken as evidence of conformance and, more particularly, the ability to inject brine into an individual well and then recover the brine by production is evidence of flow conformance. Additionally, successful application of the SWTT implies conformance. A particular advantage of using a single well for injection and production in accordance with the teachings of embodiments of the present invention is that dispersion due to reservoir heterogeneity will be greatly reduced, compared to well-to-well tests, because the fluid flow paths are retraced back to the well. For example, if the zone of interest is layered, the injected oil will advance fastest in the higher permeability layers but will also return fastest through these layers. Effects of heterogeneity are then largely cancelled.

A basic test for increased oil production is to inject a known volume of oil having sufficiently low viscosity such that viscous fingering of the injected brine is avoided, into a formation that is at, or very close to, residual oil saturation. For evaluation of the effectiveness of sequential flooding in the region around the well bore, the volume of oil injected may be approximately equal to the tracer test volume. The well is then placed in production. Reduction in residual oil in the region invaded by the injected oil will result in a net increase in oil recovery.

Increase in oil recovery by the procedure described above may be determined directly from a material balance. FIGS. 5A-5C, hereof, provide an example of the calculated recovery as a function of the reduction in residual oil saturation given by recharging a volume of the reservoir around the well bore and then waterflooding to recover the injected oil plus additional oil from the formation. The recovery and other diagnostics of the test performance may be monitored, for example, by addition of chemical tracers to the injected oil, as an example.

After completion of the oil injection/production cycle, and after the well has returned to high water cut, the SWTT may then be used to determine the reduction in residual oil saturation achieved by the single-well oil injection/production. The oil recovery performance and tracer test results may be used to assess the effects of reservoir heterogeneity and viscosity ratio on dispersion during the injection and production processes. For example, if water fingers through the zone defined by the volume of injected oil, the period of co-production of brine and oil will be extended according to the severity of the fingering as indicated by water production and tracer tests. Known methods of mobility control can be applied if needed.

Material balance, chemical tracers, and other techniques of determining the amount and source of the produced oil may be applied to the described production scheme. An advantage of testing using the two stage reduction in residual oil is that the larger decrease in residual oil saturation can be measured with greater certainty.

Sequential flooding processes WF2 and WF3 may be used to investigate the effectiveness of the process within a few days if the radius of investigation is small, for example, 30 feet. Single-well, double sweep tests may be conducted with step increases in radius of investigation for diagnosis, at different scales, of viscous fingering, and other phenomena that impact dispersion and flow conformance.

With sufficient increase in the radius of sweep, sequential waterflooding by the single-well reverse sweep process hereof can be scaled up to give economic commercial production.

Single-well reverse waterflooding has the advantage that the effects of heterogeneity on flow patterns are likely to be self-cancelling as a result of reversal of direction of flow so that dispersion effects are reversed. Monitoring of the concentration of injected oil in the net produced oil will provide a diagnosis of the effect of dispersion of oil resulting from injection of oil coupled with the degree of reversal of the dispersion which results from the oil bank retracing its flow path to the wellbore. Addition of a tracer (non-partitioning) to the injected water will allow mixing between the injected brine and the reservoir brine to be evaluated through analysis of the produced water. Other diagnostics of reservoir response and performance using single-well reverse flooding may be envisioned. These include tests which serve as an alternative or supplement to laboratory tests of oil recovery and other multi-phase flow phenomena.

For example, the record of oil recovery performance and tracer test results can be used to assess how the complex interacting effects of reservoir heterogeneity, wettability, and viscosity ratio determine dispersion of flowing oil and water. Injection/production tests can be made for the effect of oil viscosity and dispersion by viscous fingering. Reverse-waterflood (WF2 followed by WF3) having increasing maximum distance of advance from the well can be used to investigate the values of oil viscosity for which sequential flooding is viable. Such investigations may be used to determine the optimum volume of the initially injected oil and to test whether capture of residual oil by the bank is sufficient to maintain its integrity with respect to degeneration by dispersion effects. If water fingers through the zone defined by the volume of injected oil, the period of co-production of brine and oil will be determined by the severity of the fingering.

More efficient growth of the oil bank during its initial development can be achieved by injection of a selected aqueous phase prior to charging with oil, for example, dilute brine, to displace the reservoir brine from around the wellbore. The injected oil partially displaces brine, so the fraction of brine that is initially associated with the injected oil will have low salinity. High displacement efficiencies have been observed when the connate (initial interstitial or water associated with the oil bank) water is a dilute brine (See, e.g., "Salinity, Temperature, Oil Composition And Oil Recovery By Waterflooding" by G. O. Tang and N. R. Morrow, SPE Reservoir Engineering 12(4), 269-276 (November 1997).). High displacement efficiency has also been observed if both the connate and injected brine are dilute (Tang and Morrow, supra). After injection of oil, dilute brine may be injected to take advantage of the higher microscopic displacement efficiency observed for waterflooding with low-salinity water, thereby promoting more efficient initial development and growth of the oil bank.

The foregoing description of the invention has been presented for purposes of illustration and description and is not intended to be exhaustive or to limit the invention to the precise form disclosed, and obviously many modifications and variations are possible in light of the above teaching. The embodiments were chosen and described in order to best explain the principles of the invention and its practical application to thereby enable others skilled in the art to best utilize the invention in various embodiments and with various modifications as are suited to the particular use contemplated.

What is claimed is:

1. A method for recovering immobile residual oil from a reservoir, comprising the steps of:
   waterflooding the reservoir through a single well;
   charging at least a portion of the reservoir with a chosen volume of crude oil without gas through said single well, after said step of waterflooding the reservoir, whereby the chosen volume of crude oil displaces water from said step of waterflooding the reservoir;
   selecting a period of time between said step of waterflooding the reservoir through said single well and said step of charging the reservoir with a chosen volume of crude oil, whereby said step of waterflooding the charged portion of the reservoir produces enhanced recovery of immobile residual oil; and
   producing said single well to recover the charging crude oil and immobile residual oil in the reservoir following said step of charging the reservoir with a chosen volume of crude oil.

2. The method of claim 1, further comprising the step of determining the amount of recovered residual oil which comprises adding a selected quantity of a tracer material to the chosen volume of crude oil in said step of charging the reservoir, and measuring the amount tracer in the produced oil.

3. The method of claim 1, wherein the crude oil used in said step of charging the reservoir comprises crude oil obtained from the reservoir.

4. The method of claim 1, wherein said step of waterflooding is performed using seawater.

5. The method of claim 1, wherein said step of waterflooding is performed using water containing additives.

6. The method of claim 5, wherein the additives are chosen from surfactants and polymers effective for improving waterflooding efficiency, and mixtures thereof.

7. The method of claim 1, wherein the crude oil in said step of charging at least a portion of the reservoir with oil further comprises oil containing additives.

8. The method of claim 7, wherein the additives are chosen from solvents, scale inhibitors, and surface active agents, and mixtures thereof.

9. The method of claim 1, further comprising the step of waterflooding the charged portion of the reservoir after said step of charging at least a portion of the reservoir through the well with a chosen volume of crude oil.

10. The method of claim 9, wherein the time between said step of charging at least a portion of the reservoir through the well with a chosen volume of crude oil and said step of waterflooding the charged portion of the reservoir is selected to produce enhanced recovery of immobile residual oil.

11. The method of claim 9, wherein the water in said step of waterflooding comprises seawater.

12. The method of claim 9, wherein the water in said step of waterflooding comprises water containing additives.

13. The method of claim 12, wherein the additives are chosen from surfactants and polymers effective for improving waterflooding efficiency, and mixtures thereof.

14. The method of claim 1, wherein the steps are repeated until cost of the method for recovery of immobile residual oil exceeds the value of the produced oil therefrom.

\* \* \* \* \*